Patented Mar. 7, 1944

2,343,411

UNITED STATES PATENT OFFICE 2,343,411

CURRENT SUPPLY SYSTEM

Otho D. Grandstaff, Turner W. Gilman, and Roswell H. Herrick, Oak Park, Ill., assignors to Automatic Electric Laboratories, Inc., a corporation of Delaware Application March 2, 1942, Serial No. 433,024

12 Claims. (Cl. 171—97)

The present invention relates to current supply systems and, more particularly, to improvements in thermionic rectifying equipment for rectifying current derived from an alternating current source and for delivering the rectified current to a load circuit.

In systems of the character mentioned it is necessary to provide rectifying equipment having adequate capacity to meet the peak load demands, and which will operate at tolerable efficiency under all load conditions. It is also necessary in the usual installation to maintain the system supply voltage substantially constant, regardless of the load current demands thereon, and to obtain the maximum possible service from the rectifying elements used in the system. In certain applications, such, for example, as supply systems for telephone exchanges, the wide variations in the load demands make these requirements somewhat difficult to obtain. Thus if rectifying equipment having an adequate capacity to supply the peak load demands is provided, such equipment inherently operates with poor efficiency under light load conditions. More important, in those systems of the character which employ rectifying elements of the thermionic type, tube "stripping" causes a reduction in the serviceable life of the tubes. This is due to the fact that when a tube of given rating is operated substantially below its rating, conditions exist therein which cause a reduction of the effective cathode area after a short period of use. Incident to the reduction of the effective cathode area of the tube, the internal resistance of the tube is increased to produce a corresponding decrease in the output voltage thereof accompanied by a decrease in the efficiency of the circuit.

It is an object of the present invention, therefore, to provide a current supply system of the character described, which is efficient in operation over a wide load range, maintains its output voltage substantially constant regardless of the load current demands, and includes provisions for enhancing the life of the rectifying tubes embodied therein.

It is another object of the invention to provide a system of the character described, which is simple in arrangement and wherein all unnecessary duplication of circuit elements is eliminated.

Figure 1:
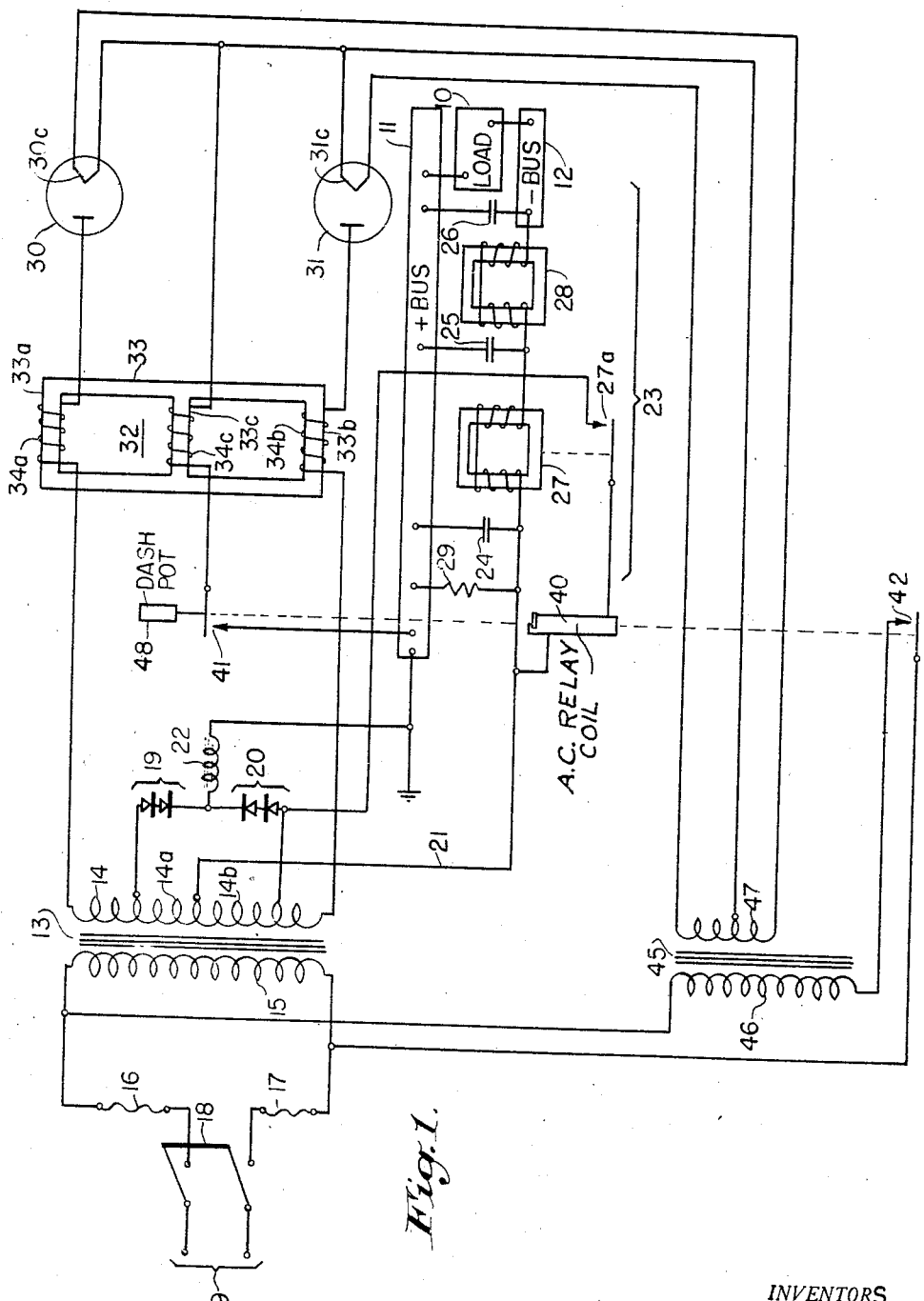
Figure 2:
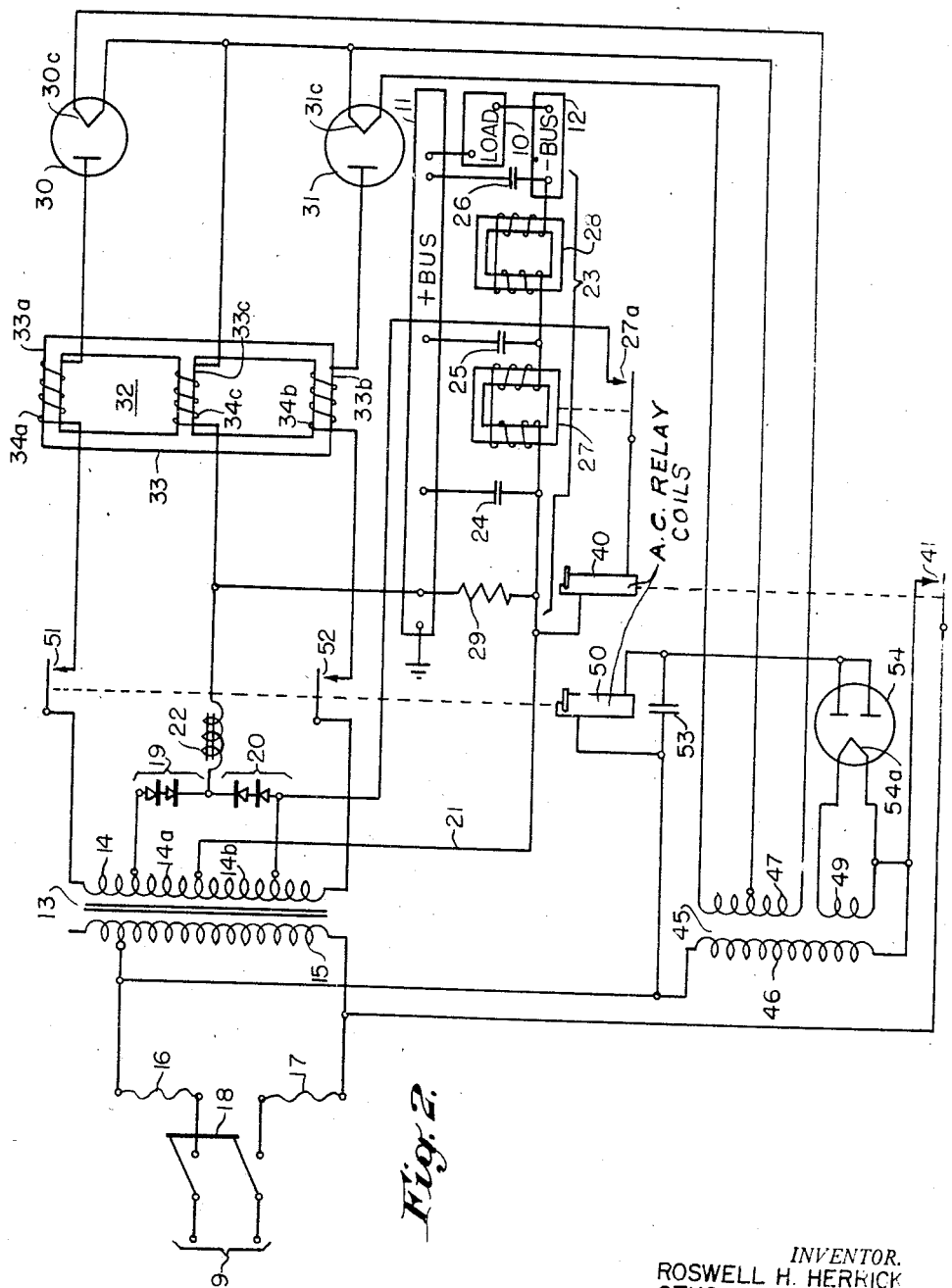

The invention, both as to its organization and method of operation, together with further objects and advantages thereof, will best be understood by reference to the specification taken in connection with the accompanying drawings in which Fig. 1 illustrates one embodiment of a current supply system characterized by the features of the present invention, and Fig. 2 illustrates a modification of the circuit shown in Fig. 1.

Referring now more particularly to Fig. 1 of the drawings, the current supply system there illustrated comprises a load circuit 10 to which direct current is supplied through rectifying equipment from an alternating current feeder circuit terminating at the terminals under the bracket 9. If desired, the load circuit 10, which extends between the positive and negative bus conductors 11 and 12, may comprise relays, magnets, and other circuit elements of the character conventionally used in a telephone exchange. The rectifying equipment comprises two rectifying circuits, one of which is of small capacity or low current rating and is used to supply current through the bus conductors 11 and 12 to the load circuit 10 under light load conditions. The second rectifying circuit is of large capacity or high current rating and is provided for taking over the current demands of the load circuit 10 when these demands exceed a predetermined value. Alternating current is supplied to these two rectifying circuits through a common voltage transformer 13 which is provided with a secondary winding 14 and a primary winding 15. This primary winding is arranged to be connected to the feeder circuit terminals 9 through a pair of fuse links 16 and 17 and the blades of a knife switch 18. The secondary winding 14 of the transformer 13 is commonly included in the two rectifying circuits mentioned above. More specifically, the small capacity rectifying circuit is of the full wave type and includes oppositely poled rectifier elements 19 and 20 and the sections 14a and 14b of the secondary winding 14. The indicated rectifier elements are preferably of the well-known dry disc type. Direct current is normally supplied from this circuit to the load circuit 10 over a path which includes the conductor 21, the iron core, filter choke 22 and the elements of a filter network indicated generally at 23. Briefly considered, this network, which is provided for smoothing the output voltages of both rectifying circuits, comprises a shunt-connected resistor 29, shunt-connected condensers 24, 25 and 26 which are separated in the network by the winding of a switching relay 27 and the winding of an iron core choke 28. As will be noted from an inspection of the network, these windings are serially included in the direct current path over which current is supplied to the load circuit 10.

The large capacity rectifying circuit is also of the full wave type and includes the whole of the transformer secondary winding 14, a pair of thermionic rectifier tubes 30 and 31, and the windings of a three-legged saturable core reactor 32. More specifically, the reactor 32 is provided with a saturable core 33 having two outer legs 33a and 33b which carry voltage regulating windings 34a and 34b, respectively, and a center leg 33c which carries a saturating winding 34c. Direct current is supplied to the load circuit 10 from the described large capacity rectifying circuit over a path which includes the conductor 21, the filter network 23, the saturating winding 34c of the reactor 32, and the contacts 41 of an alternating current start relay 40.

The rectifying tubes 30 and 31 may be of any desired commercial type suited to the current requirements of the load circuit 10. These tubes are illustrated as comprising cathodes of the filamentary type wherein the electron emitting surface of each cathode is provided as a coating on the cathode heater. For the purpose of supplying energizing current to the cathodes 30c and 31c, a current supply circuit is provided which comprises a voltage step-down transformer 45 having its primary winding 46 arranged to be connected in parallel with the primary winding 15 of the transformer 13 through the contacts 42 of the start relay 40, and the two sections of its secondary winding 47 connected across the cathodes 30c and 31c, respectively. In order to delay the closing of the above-described large capacity rectifying circuit for a short time interval after the cathodes 30c and 31c are energized, the relay 40 is provided with a dashpot 48 which functions to restrain the contacts 41 out of engagement for a short time interval after the contacts 42 are closed. The circuit for energizing this relay is controlled by the contacts 27a of the load current responsive switching relay 27. In this regard it is pointed out that the relay 27 is so constructed and arranged that it closes its contacts 27a to energize the alternating current relay 40 only when the current supplied to the load 10 exceeds a predetermined value substantially equal to the current rating of the small capacity rectifying circuit.

In considering the operation of the system, it will be understood that when the knife switch 18 is closed, current is supplied to the load circuit 10 by the small capacity rectifying circuit. More specifically, during alternate half-cycles of the voltage appearing across the secondary winding sections 14a and 14b, current is supplied alternately through the rectifier elements 19 and 20 to the load circuit 10. Thus during one half of each voltage cycle, current is delivered to the load circuit 10 over a circuit which extends from the upper terminal of the secondary winding section 14a by way of the rectifier elements 19, the choke coil 22, the positive bus conductor 11, the load circuit 10, the negative bus conductor 12, the winding of the choke coil 28, the winding of the switching relay 27, and the conductor 21 to the tapped midpoint of the secondary winding 14. During each alternate half-cycle of the voltage appearing across the winding 14, current is delivered to the load circuit 10 over a circuit which extends from the lower terminal of the secondary winding section 14b by way of the rectifier elements 20, the choke coil 22, the positive bus conductor 11, the load circuit 10, the negative bus conductor 12, the winding of the choke coil 28, the winding of the relay 27, and the conductor 20 to the mid-point of the secondary winding 14. The action of the filter network 23 and the choke coil 22 as provided in the current supply circuit serves to smooth the voltage across the bus conductors 11 and 12, thereby to minimize pulsations in the current traversing the load circuit 10.

When the current required by the load circuit 10 rises to a predetermined value substantially equaling the current rating of the small capacity rectifying circuit, the marginal switching relay 27 closes its contacts 27a to complete a circuit including the secondary winding section 14b for energizing the winding of the alternating current relay 40. When thus energized the relay 40 starts to attract the armature controlling the contacts 41 against the restraining force of the dashpot 48 and immediately closes its contacts 42 to bridge the primary winding 46 of the transformer 45 across the alternating current feeder circuit extending to the bracketed terminals 9. When the transformer 45 is thus energized, energizing current is supplied to the cathodes 30c and 31c for the purpose of heating these cathodes to electron emitting temperatures, thereby to render the tubes 30 and 31 conductive. The interval measured by the action of the dashpot 48 in holding the contacts 41 disengaged, is sufficient to insure that the tubes 30 and 31 will be fully conductive before the large capacity rectifying circuit is completed. This arrangement prevents destruction of the tubes 30 and 31 by impressing the full voltage of the secondary winding 14 thereacross before they are conditioned for operation. Shortly after the cathodes of these tubes are heated to electron emitting temperatures, the contacts 41 of the relay 40 are closed to complete the large capacity rectifying circuit. After this circuit is closed the current is supplied to the load circuit 10 alternately through the two tubes 30 and 31. Thus during alternate cycles of the alternating voltage appearing across the secondary winding 14, current traverses the load circuit 10 in a direction which extends from the upper terminal of the winding 14 by way of the voltage regulating winding 34a, the space current path of the tube 30, the saturating winding 34c, the contacts 41, the positive bus conductor 11, the load circuit 10, the negative bus conductor 12, the winding of the choke coil 28, the winding of the switching relay 27, and the conductor 21 to the midpoint of the secondary winding 14. During the intervening half-cycles of the voltage appearing across the secondary winding 14, current is supplied to the load circuit 10 in a direction which extends from the lower terminal of this winding by way of the winding 34b, the space current path of the tube 31, the saturating winding 34c, the contacts 41, the positive bus conductor 11, the load circuit 10, the negative bus conductor 12, the winding of the choke coil 28, the winding of the switching relay 27, and the conductor 21 to the midpoint of the winding 14. Here again the voltage appearing across the bus conductors 11 and 12 is smoothed through the action of the filter network 23 and the choke coil 22, so that a substantially ripple-free voltage is impressed upon the load circuit 10. Preferably, the constants of the circuit elements included in the large capacity rectifying circuit and the voltage ratio of the voltage introduced in this circuit by the secondary winding 14 are so related to the corresponding factors of the small capacity rectifying circuit that substantially all of the current demanded by the load circuit 10 is supplied by way of the rectifying tubes 30 and 31. The purpose of this arrangement is to insure that these tubes will be substantially loaded in order that the best possible operating efficiency may be obtained.

It will be observed from the above explanation that the winding of the switching relay 27 is included in the direct current path over which current is supplied to the load circuit 10. When the magnitude of this current falls below the predetermined value approximating the current rating of the small capacity rectifying circuit, the relay 27 is insufficiently energized to maintain its contacts 27a in engagement. Each time these contacts are opened, the start relay 40 is deenergized and opens its contacts 41 and 42 to interrupt the large capacity rectifying circuit and to deenergize the cathodes of the rectifying tubes 30 and 31. Thus the load is shifted back to the small capacity rectifying circuit.

It will also be observed from the above explanation that when the large capacity rectifying circuit is completed, current is supplied to the load circuit 10 through the saturating winding 34c of the saturable core reactor 32. As this current rises in magnitude, the various voltage drops through the tubes 30 and 31 and through the other circuit elements included in the paths traversed by this current increase, thus tending to lower the voltage appearing across the bus conductors 11 and 12. This tendency of the system bus voltage to decrease with increasing load current demands, is compensated for by the action of the saturable core reactor 32. Thus as the current through the saturating winding 34c increases, the flux produced in the center leg 33c of the core 33 is increased, thereby effectively to reduce the impedance of the voltage regulating windings 34a and 34b. As these impedances are lowered, the voltage drops thereacross are correspondingly decreased so that a larger proportion of the available voltage across the secondary winding 14 appears in rectified form across the bus conductors 11 and 12. The reverse action obviously takes place in response to a decrease in the current supplied to the load circuit 10. It will be seen, therefore, that by virtue of the regulating action of the saturable core reactor 32, a substantially constant voltage is maintained across the system bus conductors 11 and 12, regardless of the magnitude of the current demanded by the load circuit 10.

The arrangement of the current supply system illustrated in Fig. 2 of the drawings is substantially similar to that shown in Figure 1 of the drawings and described above. Accordingly, corresponding reference characters have been used to identify like parts of the two systems. From a comparison of the two systems it will be noted that the only respect in which that of Fig. 2 differs from that shown in Fig. 1 pertains to the manner in which the large capacity rectifying circuit is switched in and out of service. In the Fig. 2 arrangement, the switching operations are performed by an alternating current relay 50 which is provided with contacts 51 and 52 respectively included in the outer legs of the current paths extending to the two rectifying tubes 30 and 31. The winding of this relay is shunted by a condenser 53 and is arranged to be energized by current supplied thereto from the alternating current feeder circuit through the space current path of a thermionic device 54. More specifically, the tube 54 is of the commercial type 80 and is connected to operate as a half-way rectifier. This tube is provided with a cathode 54a which is arranged to be energized by a low voltage tertiary winding 49 provided on the current supply transformer 45.

In the operation of the system shown in Fig. 2 of the drawings, current is supplied to the load 10 solely by the small capacity rectifying circuit comprising the rectifying elements 19 and 20 so long as the load current demands do not exceed a predetermined value approximating the current rating of this circuit. When, however, the current supply to the load circuit 10 exceeds this predetermined value the switching relay 27 closes its contacts 27a to energize the relay 40. The latter relay, in operating, closes its contacts 41 to bridge the primary winding 46 of the current supply transformer 45 across the alternating current feeder circuit. In response to this operation, current is supplied to the cathodes 54a, 30c and 31c over obvious circuits. During the short time interval required to heat the cathode 54a, the cathodes 30c and 31c are heated likewise to a temperature sufficient to render the rectifying tubes 30 and 31 conductive. When the rectifier tube 54 becomes conductive, pulsating current is passed through the winding of the relay 50, causing this relay to operate. At its contacts 51 and 52, the relay 50 completes the large capacity rectifying circuit in an obvious manner, whereby current is supplied to the load circuit 10 through the tubes 30 and 31 rather than through the rectifying elements 19 and 20.

When the current supplied to the load circuit 10 is decreased below the predetermined value approximating the current rating of the small capacity rectifying circuit, the marginal switching relay 27 opens its contacts 27a to deenergize the relay 40. The latter relay, upon restoring, opens its contacts 41 to deenergize the relay 50 and the cathodes 54a, 30c and 31c. Upon restoring, the relay 50 interrupts, at its contacts 51 and 52, two points in the large capacity rectifying circuit. Thus the system load is shifted from this rectifying circuit back to the small capacity rectifying circuit. Aside from the differences pointed out above, the system shown in Fig. 2 of the drawings operates in the exact manner explained above with reference to that illustrated in Fig. 1 of the drawings.

While two embodiments of the invention have been disclosed, it will be understood that various modifications may be made therein which are within the true spirit and scope of the invention.

What is claimed is:

1. In a current supply system including a load circuit, a source of alternating current, a switching relay having a winding, a filter network serially including said winding, a small capacity rectifier connected to said source and operative to deliver rectified current through said network to said load circuit, a normally inactive large capacity rectifier operative to deliver rectified current through said network to said load circuit, said switching relay being operative when the load current traversing said network exceeds a predetermined value, and means responsive to operation of said relay for rendering said large capacity rectifier operative to deliver current to said load circuit.

2. In a current supply system including a load circuit, a source of alternating current, a switching relay having a winding, a filter network serially including said winding, a small capacity rectifier connected to said source and operative to deliver rectified current through said network to said load circuit, a normally inactive large capacity rectifier operative to deliver rectified current through said network to said load circuit at a voltage slightly in excess of the output voltage of said small rectifier, whereby substantially the entire load is assumed by said large capacity rectifier when the two rectifiers are connected in parallel, said switching relay being operative when the load current traversing said network exceeds a predetermined value, and means responsive to operation of said relay for connecting said rectifiers in parallel.

3. In a current supply system including a load circuit, a source of alternating current, a switching relay having a winding, a filter network serially including said winding, a small capacity rectifier connected to said source and operative to deliver rectified current through said network to said load circuit, a large capacity rectifier having an input circuit adapted to be connected to said source and including thermionic rectifying means operative to deliver rectified current through said network to said load circuit when said input circuit is completed, said thermionic rectifying means including cathode heating means, said switching relay being operative when the load current traversing said network exceeds a predetermined value, and means responsive to operation of said relay for energizing said cathode heating means and for completing said input circuit a predetermined time interval thereafter.

4. In a current supply system including a load circuit, a source of alternating current, a switching relay having a winding, a filter network serially including said winding, a first rectifier connected to said source and operative to deliver rectified current through said network to said load circuit, a second normally inactive rectifier also operative to deliver rectified current through said network to said load circuit, said switching relay being operative when the load current traversing said network exceeds a predetermined value, and means responsive to operation of said relay for connecting said rectifiers in parallel.

5. In a current supply system which includes a load circuit, a source of alternating current, a transformer connected to said source and having a secondary winding, rectifying means normally disconnected from said secondary winding but operative to deliver rectified current to said load circuit when connected to said secondary winding, a switching relay operative to connect said rectifying means to said secondary winding when the load current demands of said load circuit exceed a predetermined value, and additional rectifying means connected to said secondary winding and operative to supply rectified current to said load circuit until the load current demands of said circuit exceed said predetermined value.

6. In a current supply system which includes a load circuit, a source of alternating current, a transformer connected to said source and having a secondary winding, large and small capacity rectifying circuits commonly including said secondary winding and each operative to deliver rectified current to said load circuit, said large capacity rectifying circuit normally being incomplete, and load current responsive means for completing said large capacity rectifying circuit when the current supplied to said load circuit by said small capacity rectifying circuit exceeds a predetermined value.

7. In a current supply system which includes a load circuit, a source of alternating current, a transformer connected to said source and having a secondary winding, large and small capacity rectifying circuits respectively including different portions of said secondary winding and each operative to deliver rectified current to said load circuit, said large capacity rectifying circuit normally being incomplete, and load current responsive means for completing said large capacity rectifying circuit when the current supplied to said load circuit by said small capacity rectifying circuit exceeds a predetermined value.

8. In a current supply system which includes a load circuit, a source of alternating current, a normally incomplete rectifying circuit which, when completed, is operative to deliver current to said load circuit, said rectifying circuit including two alternating current paths and a direct current path which includes said load circuit, a saturable core reactor having a saturating winding included in said direct current path and voltage regulating windings respectively included in said alternating current paths, and load current responsive means for completing said rectifying circuit when the load current demands of said load circuit exceed a predetermined value.

9. In a current supply system which includes a load circuit, a source of alternating current, a transformer connected to said source and having a secondary winding, a normally incomplete large capacity rectifying circuit which, when completed, is operative to deliver current to said load circuit, said rectifying circuit including said secondary winding and having two alternating current paths and a direct current path which includes said load circuit, a saturable core reactor having a saturating winding included in said direct current path and voltage regulating windings respectively included in said alternating current paths, a small capacity rectifying circuit including at least a portion of said secondary winding and normally operative to deliver current to said load circuit, and load current responsive means for completing said large capacity rectifying circuit when the current supplied to said load circuit by said small capacity rectifying circuit exceeds a predetermined value.

10. In a current supply system which includes a load circuit, a normally incomplete rectifying circuit for delivering current to said load circuit, said rectifying circuit including thermionic rectifying means having cathode heating means, a thermionic device having a cathode heater, means for substantially simultaneously energizing said cathode heater and said cathode heating means, and means controlled by said thermionic device for completing said rectifying circuit a predetermined time interval after said cathode heating means is energized.

11. In a current supply system which includes a load circuit, a normally incomplete rectifying circuit for delivering current to said load circuit, said rectifying circuit including thermionic rectifying means having cathode heating means, a thermionic device having a cathode heater, means including a second rectifier circuit for normally supplying current to said load circuit, load current responsive means for substantially simultaneously energizing said cathode heater and said cathode heating means, and means controlled by said thermionic device for completing said rectifying circuit a predetermined time interval after said cathode heating means is energized.

12. In a current supply system which includes a load circuit, a normally incomplete large capacity rectifying circuit which, when completed, is operative to deliver current to said load circuit, said rectifying circuit including thermionic rectifying means having cathode heating means, means including a small capacity rectifying circuit for normally supplying current to said load circuit, a thermionic device including a cathode heater, load current responsive means for substantially simultaneously energizing said cathode heater and said cathode heating means when the current supplied to said load circuit by said small capacity rectifying circuit exceeds a predetermined value, and means controlled by said thermionic device for completing said large capacity rectifying circuit a predetermined time interval after said cathode heating means is energized.

OTHO D. GRANDSTAFF.
TURNER W. GILMAN.
ROSWELL H. HERRICK.